Figure 1:
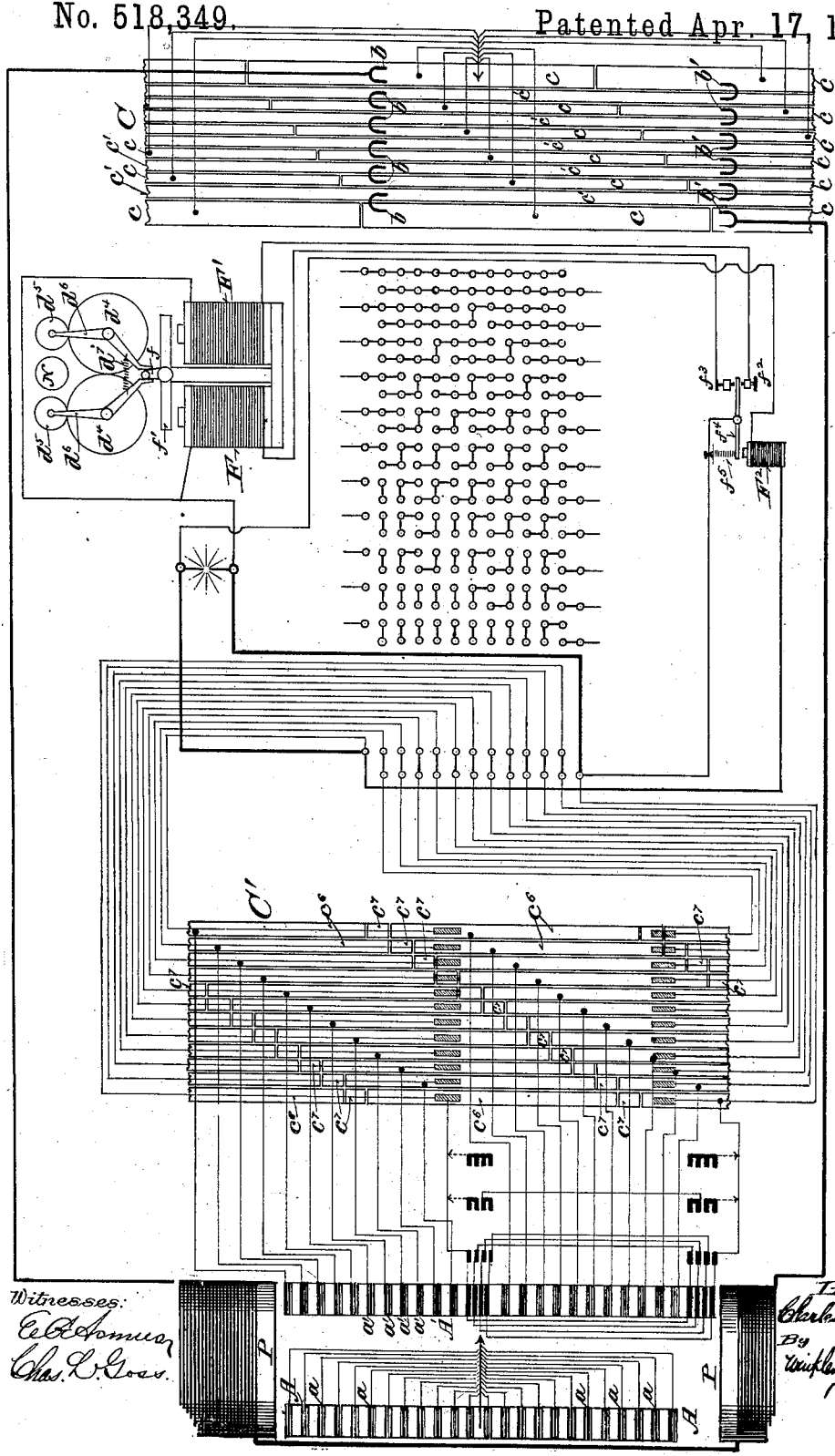

(No Model.) 5 Sheets—Sheet 1.

C. L. F. MÜLLER, Dec'd.
C. B. CARSTENS, Administrator.
REGULATOR FOR DYNAMO ELECTRIC MACHINES.

No. 518,349. Patented Apr. 17, 1894.

Witnesses:
Inventor:
Attorneys.

(No Model.) 5 Sheets—Sheet 2.

C. L. F. MÜLLER, Dec'd.
C. B. CARSTENS, Administrator.
REGULATOR FOR DYNAMO ELECTRIC MACHINES.

No. 518,349. Patented Apr. 17, 1894.

Witnesses:

Inventor:
Charles L. F. Müller,
By Winkler Flanders Smith Bottum & Vilas
Attorneys.

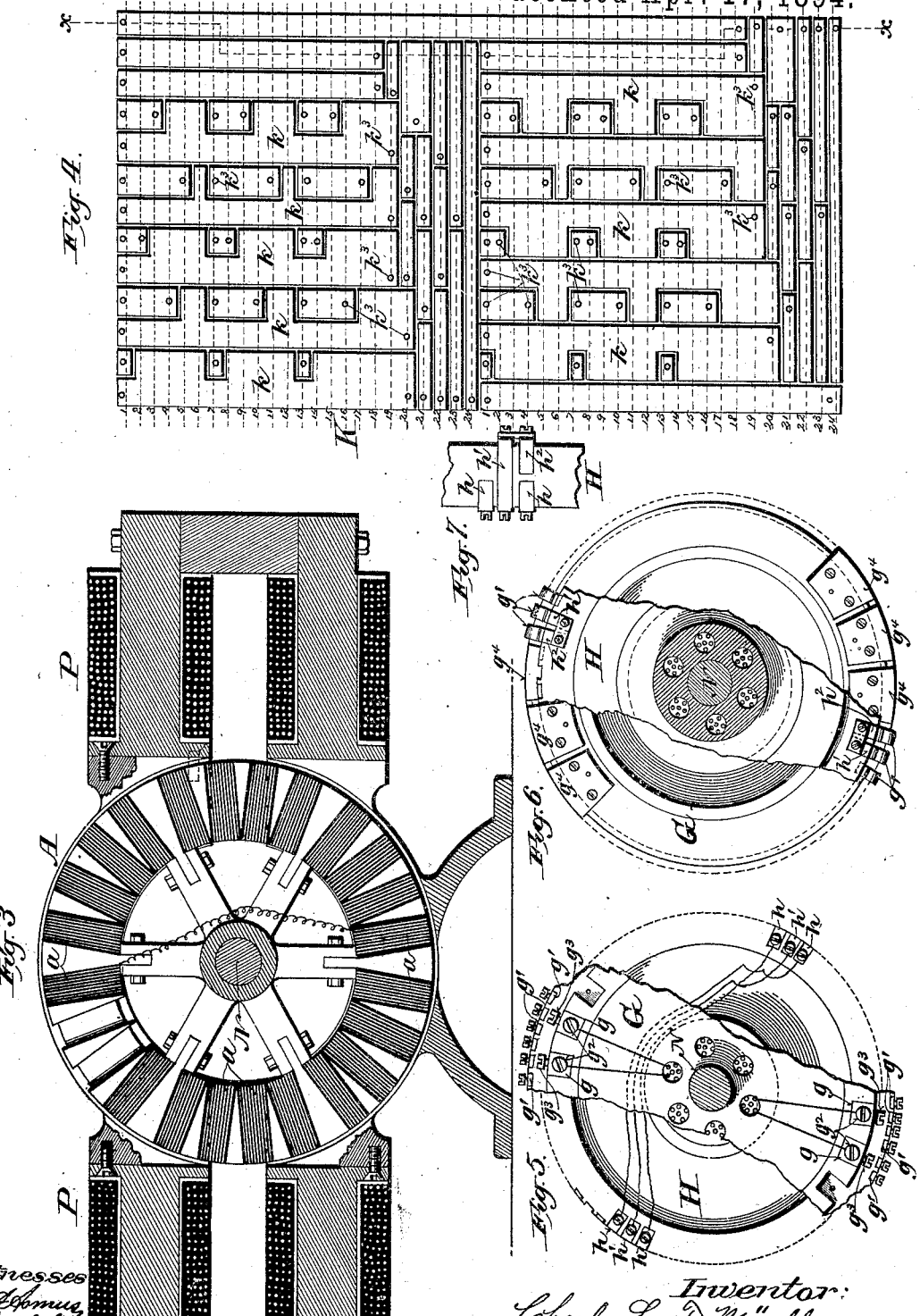

(No Model.) 5 Sheets—Sheet 4.
C. L. F. MÜLLER, Dec'd.
C. B. CARSTENS, Administrator.
REGULATOR FOR DYNAMO ELECTRIC MACHINES.
No. 518,349. Patented Apr. 17, 1894.
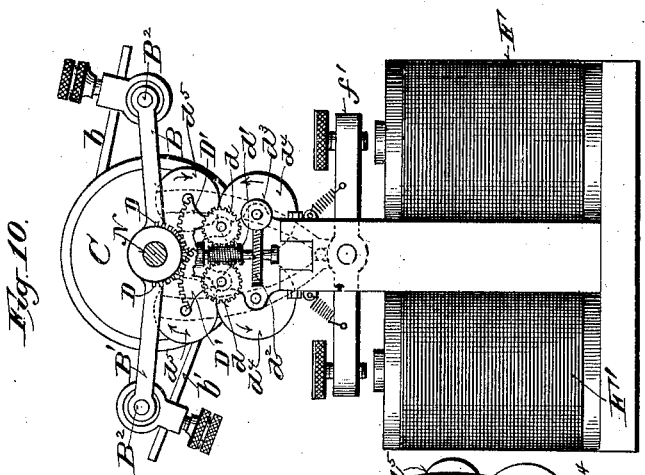
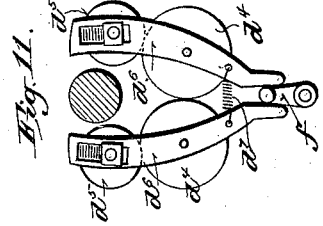
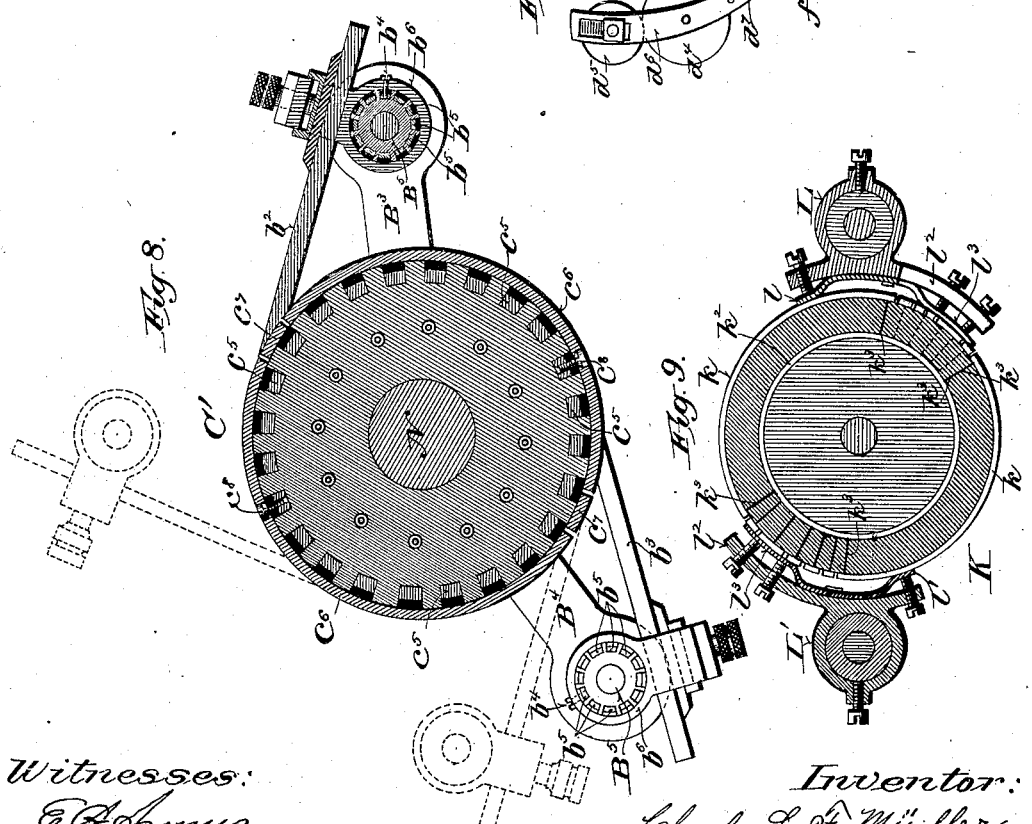
Witnesses:
Inventor:
Charles L. F. Müller,
By Winkler Flanders Smith Bottum Vilas
Attorneys.

(No Model.) 5 Sheets—Sheet 5.

C. L. F. MÜLLER, Dec'd.
C. B. CARSTENS, Administrator.
REGULATOR FOR DYNAMO ELECTRIC MACHINES.

No. 518,349. Patented Apr. 17, 1894.

Witnesses:

Inventor:
Charles L. F. Müller
By Winkler Flanders Smith Bottum & Vilas

UNITED STATES PATENT OFFICE.

CHARLES L. F. MÜLLER, OF MILWAUKEE, WISCONSIN; CHARLES B. CARSTENS, OF SAME PLACE, ADMINISTRATOR OF SAID MÜLLER, DECEASED, ASSIGNOR TO THE WISCONSIN ELECTRIC LIGHT AND POWER COMPANY, OF WISCONSIN.

REGULATOR FOR DYNAMO-ELECTRIC MACHINES.

SPECIFICATION forming part of Letters Patent No. 518,349, dated April 17, 1894.

Application filed May 13, 1889. Serial No. 310,581. (No model.)

*To all whom it may concern:*

Be it known that I, CHARLES L. F. MÜLLER, of Milwaukee, in the county of Milwaukee and State of Wisconsin, have invented certain new and useful Improvements in Dynamo-Electric Machines; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are first to regulate the strength of the working current by excluding from activity the coils of the armature supplying the exciting current for a greater or less portion of their angular movement and thereby decreasing or increasing the inductive action of the field magnet upon the armature supplying the working current; second, to produce working currents of different degrees of quantity or intensity by variously coupling the coils or conductors of a revolving armature, and third, to effect a gradual change in quantity or intensity of the working current.

It consists essentially of a rotary armature provided with independent coils or pairs of diametrically opposite connected coils; a commutator having divided circular rings or semicircular plates arranged in pairs corresponding in number and angular position with the number and angular position of said coils, with the free ends of which the semicircular plates are connected in corresponding pairs; a like number of brushes connected in series or single circuit working with the semicircular plates of said commutator the brushes of one or both sets being capable of angular movement toward and from each other about the periphery of said commutator; automatically controlled regulating mechanism connected with and arranged to impart said angular movement to one or both sets of brushes or their holders, and of certain other peculiarities in the construction and arrangement of the current regulating apparatus or mechanism hereinafter specifically set forth.

It consists further of one or more revoluble armatures provided with independent simple or compound coils or pairs of connected coils, a commutator having a like number of pairs of semicircular or segmental plates connected with the free ends of said coils, and corresponding in their angular position with reference to the axis of rotation to the angular position of said coils, a like number of pairs of brushes working with the several pairs of commutator sections, a device by which the several pairs of coils or their terminals may be variously grouped or combined in series, or in multiple arc or parallel or in groups of two, three, four, &c., to produce currents of different degrees of quantity and intensity and of certain peculiarities of construction and arrangement hereinafter specifically set forth.

It consists further in dividing the several armature coils into sections and of providing a device whereby the sections of each coil or of each pair of coils may be combined in series, multiple arcs or groups for producing currents of different degrees of quantity or intensity.

It consists further of a commutator composed of pairs of segmental sections each connected with the free ends of a corresponding number and arrangement of independent armature conductors of coils combined in series, a corresponding number of pairs of brushes working with the several pairs of commutator sections, one or both sets of brushes or one or both brushes of each pair being movable circumferentially toward and away from the other, whereby a greater or less length of said armature conductors or number of windings are engaged at any one time in the production of the working current, of a governor by which the desired strength of current is maintained when its intensity is changed by moving said brushes, and of certain peculiarities of construction and arrangement hereinafter specified and pointed out in the claims.

In the accompanying drawings like letters designate the same or similar parts in the several figures.

Figure 1 is a developed plan or diagram of a machine embodying my improvements. Fig.

2 is a medial, longitudinal section of the same. Fig. 3 is a cross section through the field magnet and armature, showing one of the armature sections in side elevation. Fig. 4 is a developed plan view of the switch for variously coupling the armature coils in series, multiple arc or groups. Figs. 5, 6, and 7, are detail views of the device employed to couple sections of the armature coils in multiple arc, groups or series. Fig. 8 is a cross section of the commutator or the working circuit. Fig. 9 is a like section of the switch or grouping device taken on the line $x\,x$, Fig. 4, and representing that part of the device to the left of said line. Fig. 10 is an end elevation of the regulator or mechanism for automatically changing the positions of the brushes in the exciting circuit. Fig. 11 is a reverse view of a portion of said mechanism, and Figs. 12 to 17 inclusive are diagrams illustrating the operation and effect of changing the relative positions of the brushes.

For convenience in illustrating my improvements, I have shown the armature employed for exciting the field magnet and the armature supplying the working current with their commutators all mounted upon the same shaft or axis, although I may with the same results employ an entirely distinct and independent exciting mechanism.

Figure 2:
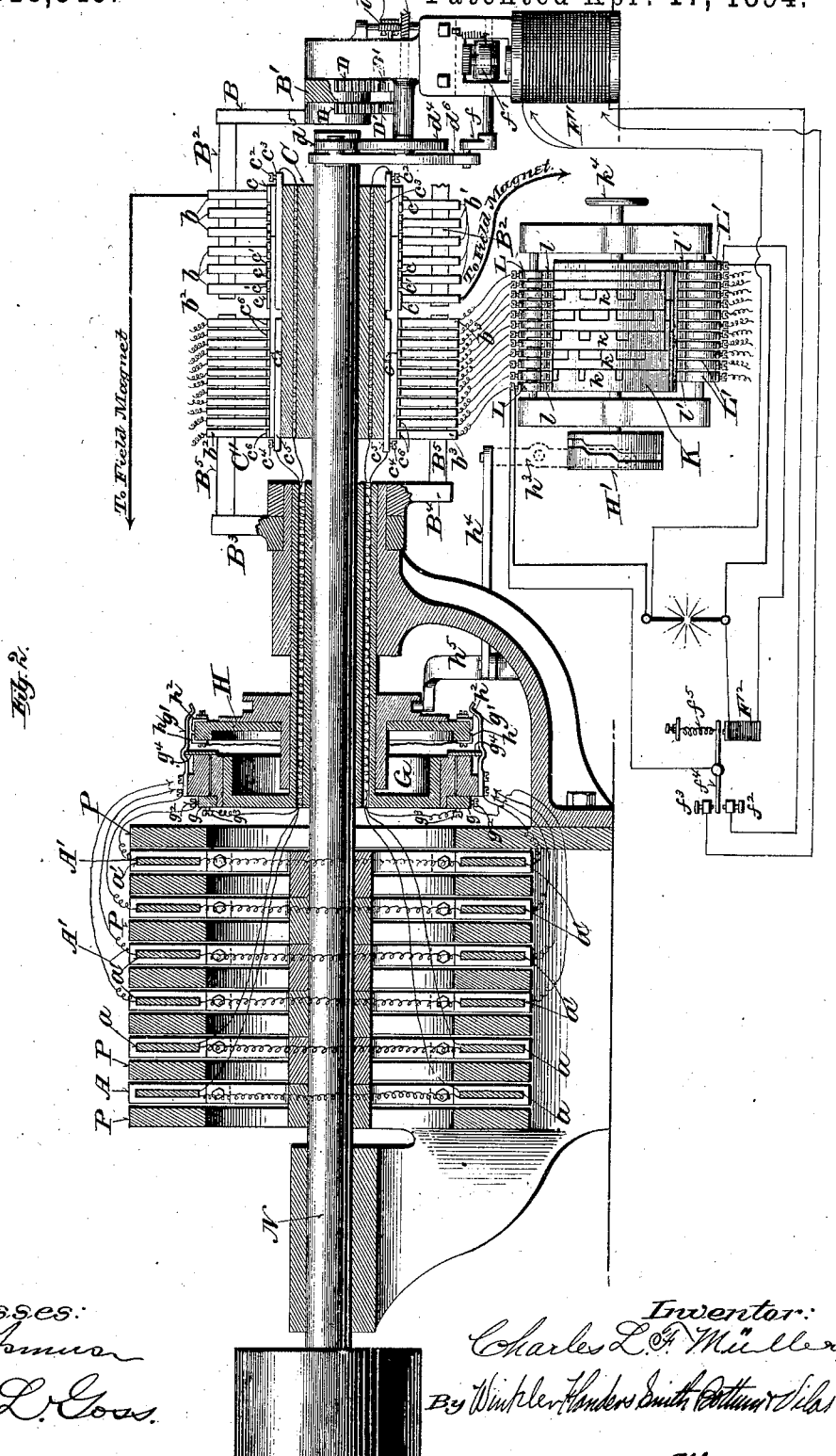
Figure 12:
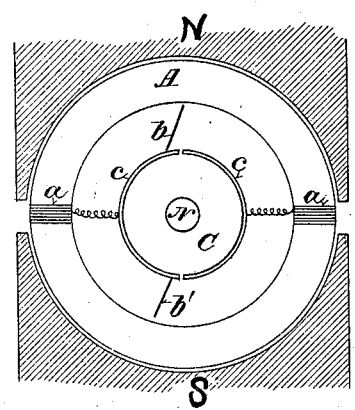
Figure 13:
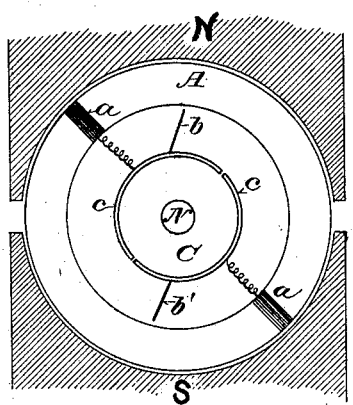
Figure 14:
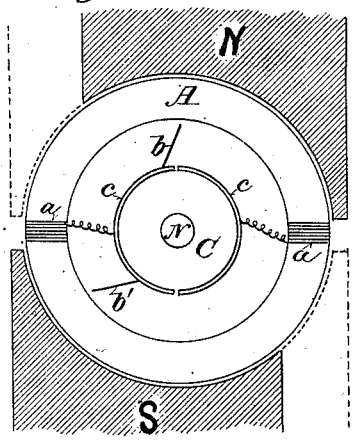
Figure 15:
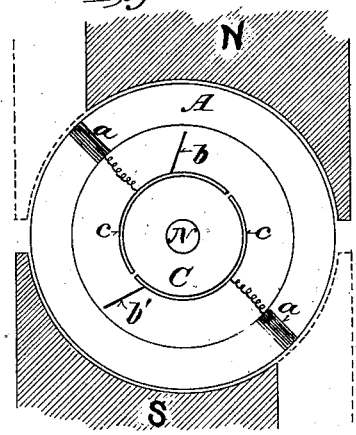
Figure 16:
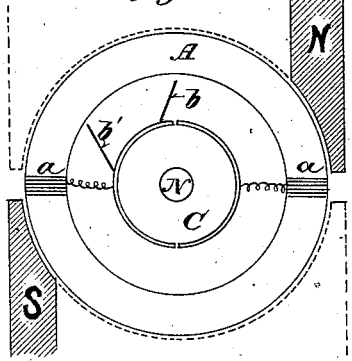
Figure 17:
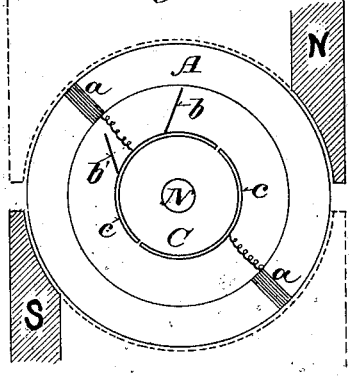

Referring to Figs. 1, 2 and 3 A represents the armature which furnishes the current for exciting or energizing the field magnet P P. It is provided in any well known or suitable manner with independent coils or pairs of connected, diametrically opposite, coils $a\,a$, the terminals of which are connected by binding screws $c^2$ and metallic rods $c^3$ or in any other suitable manner with the segmental plates $c\,c$ of the commutator C. The several pairs of commutator sections $c\,c$ correspond in number and angular position with the number and angular position of the armature coils or pairs of coils $a\,a$ with reference to the axis of rotation, and the segmental plates $c\,c$ of each pair are separated at their ends by small insulating spaces only, so as not to interrupt or break the continuity of the current. $b\,b'$ represent brushes corresponding in number with the number of the segmental commutator plates or sections $c\,c$ with which they work in pairs. These brushes are adjustably attached to rods $B^2\,B^2$ carried parallel with the shaft N by radial arms B B', which are capable of angular movement around the axis of the commutator each toward and from the other. Between the several pairs of segmental plates or sections $c\,c$ of the commutator C are interposed continuous rings $c'\,c'$ suitably insulated therefrom, and serving to connect the several brushes on one side of the commutator with the brushes on the opposite side of the commutator and the several coils of the armature A in series or single circuit, one brush of each pair working with the continuous ring $c'$ on one side while the other brush works with the continuous ring $c'$ on the opposite side of the interposed pair of segmental plates $c\,c$. The terminal brushes on opposite sides and at opposite ends of the commutator C are connected by conductors with the windings of the field magnet P P.

By the foregoing arrangement and connections of the several armature coils $a\,a$, commutator segments $c\,c$, continuous rings $c'\,c'$ and brushes $b\,b'$, as clearly indicated in Fig. 1, the several coils of armature A are included for a greater or less portion of each revolution of said armature in series in the exciting circuit, and thereby severally contribute to the exciting current.

Referring to Fig. 10 illustrating on a large scale, in connection with Figs. 2 and 11, convenient mechanism for automatically changing the angular position of the brush holders and the distance between the two sets of brushes whereby the strength of the exciting current is varied according to variations in the strength of the external or working current, C represents in end elevation the commutator of the exciting circuit; B B', the movable brush carrying arms provided with segmental gears D D, which are engaged and actuated by two similar segmental gears D' D', suitably journaled in fixed bearings and provided with worm gears $d\,d$ which are engaged by opposite sides of a driving worm $d'$. The shaft of worm $d'$ is provided with a worm gear $d^2$ which is engaged and driven by the worm $d^3$. $d^4\,d^4$ are two friction wheels supported in constant engagement with each other by suitable fixed bearings, one of said friction wheels being mounted on the shaft of the worm $d^3$. $d^5\,d^5$ are two other friction wheels carried by the upper ends of the arms $d^6\,d^6$ on opposite sides of the shaft N and each held by a spring actuated bearing in engagement with the friction wheel $d^4$ as shown in Fig. 11. The arms are pivoted or fulcrumed concentrically with the friction wheels $d^4$ to suitable supports and are extended and converge below their fulcrums to the opposite sides of a crank $f$, with which they are held in engagement by a spring $d^7$ connecting them.

The foregoing mechanism is so constructed and arranged that when one of the friction wheels $d^5$ is brought into contact with the shaft N the opposite brushes will be moved circumferentially toward each other and when the other friction wheel $d^5$ is brought into contact with said shaft the brushes will in like manner be moved away from each other.

F F' are electro magnets set to act one upon one end and the other upon the other end of the vibratory armature $f'$ to the axis of which the crank $f$ is attached. The windings of said magnet are connected with the main circuit and respectively with the contact points $f^2$ and $f^3$ of a circuit making and breaking device comprising a vibratory armature $f^4$ one end of which is interposed between said contact points and is connected with the working circuit; an electro magnet $F^2$ placed in a shunt of the working circuit so as to act on the other end of said armature, and an adjustable spring $f^5$ connected with said armature $F^2$ as shown in Figs. 1 and 2.

One set of brushes only may be made movable, it being essential simply to vary the distance between the two sets of brushes; and any suitable mechanism and apparatus for accomplishing this end may be employed in place of that shown and described.

The operation of automatically regulating the strength of the working current in my improved machine is as follows: When the strength of the main working current rises above the desired degree, the electro magnet $F^2$ overbalancing the tension of spring $f^5$ moves the armature $f^4$ into contact with the point $f^3$, thus diverting a portion of the current through the coils of the magnet F, which, thus energized attracts the adjacent end of the armature $f'$, turns the crank $f$ and carries one of the friction wheels $d^5$ into engagement with the shaft N or other continuously rotating driving wheel. Acting through the train of gears previously described said friction wheel moves the arms B B' with two sets of brushes $b$ and $b'$ toward each other. The strength of the working circuit is thereby reduced, as hereinafter explained, till the spring $f^5$ balancing the attraction of the magnet $F^2$ brings the armature $f^4$ to its middle or neutral position and breaks the circuit connecting the magnet F with the working circuit. The armature $f'$ is thus released and returns to its middle position, the friction wheel $d^5$ is moved out of engagement with the shaft N and the further approach of the opposite set of brushes toward each other is arrested. Whenever the working current falls below a given degree of strength, the spring $f^5$ overbalancing the attraction of the magnet $F^2$ establishes connection between the main circuit and the coils of the electro magnet $F'$, which through the adjacent end of the armature $f'$ sets the train in motion in the opposite direction, causing the brush holders and the two sets of brushes to recede from each other. The strength of the working current is thereby increased in the manner hereinafter explained till the attraction of the magnet $F^2$ balances the tension of the spring $f^5$, returns the armature $f^4$ to its middle position and cuts the magnet $F'$ out of circuit. The armature $F'$, as soon as released by the magnet $F'$, is brought to its middle position and the further movement in that direction of the brush moving train and of the brushes is arrested. The brushes now remain quiescent, occupying the same relative positions with reference to each other, until another variation of the working current moves them in the manner just described. The effect of changing the angular position of the movable brushes or the distance between the two sets of brushes is illustrated in Figs. 12 to 17 inclusive.

It is well understood that an electric current is induced by the field magnet in the coils of the armature only when the same are closed. When the coils are in open circuit no current is induced therein and consequently they are incapable of energizing the field magnet. It is upon this principle that my improved regulation depends.

The strength of the working current of dynamo-electric machines is usually regulated by interposing in the circuit more or less resistance thereby wasting energy which is not needed, whereas by my method of regulation only the required electrical energy is produced and mechanical energy and the fuel required to produce the same is economized to the fullest extent. The terminals of each coil or each pair of coils $a\ a$ being connected one with one of a pair of segmental commutator plates $c\ c$ and the other with the other of the same pair, it is obvious that such coil or pair of coils will be in closed circuit only when the corresponding pair of brushes $b\ b'$ are in contact one with one of said plates and the other with the other plate, and that when both of said brushes rest on the same plate the coil or coils connected with that pair will be open. While any pair of brushes rests on the same segmental plate, $c$ and the coil or pair of coils connected with said plate are open, said brushes and plate constitute a conductor between the preceding and succeeding pairs of brushes. The nearer the brushes $b$ and $b'$ approach each other the shorter will be the arc or interval of rotation in which said brushes will rest on opposite or different plates $c\ c$, and the shorter will be the energizing current induced in the coils connected with such plates, and the less will be the effect of said coils on the field magnet. The brakes between the several pairs of commutator plates $c\ c$ being in lines oblique to the axis of the commutator the several coils or pairs of coils connected with said plates will be brought successively into activity and as one coil is passing out of the arc of activity into open circuit, another will be entering the arc of activity into closed circuit. Hence the current will be continuous, but when the opposite brushes are brought near each other the corresponding coils will be in closed circuit for only a small part of a rotation, and contribute very little to the energy of the current and vice versa.

The shaded portions of the field magnet, representing the extent of the arcs of activity in which the inductive action takes place corresponding to various angular positions of the brushes, illustrate the reciprocal effects of the field magnet and coils upon each other.

The same principle of arrangement and operation hereinbefore described with reference to the exciting circuit pertains to the working circuit. The armature A' is provided like the armature A with a number of independent coils or pairs of diametrically opposite coils $a'\ a'$, the terminals of which are connected by the binding screws $c^4$ and metallic rods $c^5$ or by other suitable means with the segmental plates $c^6\ c^6$ of the commutator C'. These segmental plates correspond in angular position on the commutator with the angular position of the coils with which they are connected on the armature, and the breaks or insulating spaces between the several pairs of said plates thus occur in lines oblique to the axis of the commutator. I prefer to separate each pair of segmental plates $c^6 c^6$ by double breaks or insulating spaces between which are short plates $c^7 c^7$ as shown in Fig. 8, so as to cut the brushes out of circuit as the coils connected therewith pass the neutral points, and thereby to prevent short circuiting of the current through the commutator when the coils are all arranged or coupled in multiple arc, and so as to retain the brushes longer in circuit when arranged in groups. The segmental plates $c^6 c^6$ are severally connected with the insulated rods or bars $c^5 c^5$ by pins or screws $c^8 c^8$ as shown in Fig. 8.

$b^2 b^3$ are brushes of any suitable form and construction adjustably attached to shafts $B^5 B^5$ parallel with the axis of the commutator and carried by the radial arms $B^3 B^4$ one or both of which are capable of angular movement about said axis so as to vary the distance between the opposite brushes.

The coils $a' a'$ may be composed of a number of sections, capable of being variously arranged in series, multiple arc, or groups as indicated in Fig. 1, for the purpose of producing a current of wider variation as to quality. Various devices may be employed for coupling the sections of which the coils are composed. I show for the purpose in Figs. 2, 5, 6 and 7 a convenient device by which the several changes in the coupling of the sections may be effected while the machine is in operation. It consists of a disk G fixed upon the shaft N so as to revolve with the armature, and provided about its periphery with insulated blocks $g g$, one pair for each coil or pair of coils, springs $g' g'$—three pairs for each coil or pair of coils, and plates $g^4 g^4$—one pair for each coil or pair of coils, and severally connected by metallic rods with the blocks $g g$, as shown in Fig. 2. It consists further of a disk H mounted upon the shaft N adjacent to the disk G so as to be rotated therewith and at the same time moved laterally toward and from said disk G. It is provided about its periphery on one side with insulated plates $h h'$ corresponding in number and position with the springs $g' g'$ on the disk G. The middle plate $h'$ of each group of three plates $h h'$ is extended across the periphery of said disk and is coupled at its opposite end to a short plate $h^2$ similar to the plates $h h$ as shown in Figs. 6 and 7. The several plates $h h'$ are severally connected in groups of three with the plates of the corresponding groups on the opposite side of the disk H as shown in Fig. 5. The terminals of the coils are connected with the binding screws $g^2 g^2$ in the insulated blocks $g g$ as shown in Fig. 2 and the terminals of the intermediate sections of each coil (these sections being shown on separate armature rings although they may be variously arranged on the same ring or core), are connected in series with the corresponding groups of springs $g' g'$. Suitable conductors attached to the binding screws $g^3 g^3$ connect the blocks $g g$ with the binding screws $c^4 c^4$ in the bars $c^5 c^5$ of commutator C'. When the disk H is placed close to the disk G the bearing points of springs $g' g'$ will project over the periphery of said disk H and all rest upon the plates $g^4$ by means of which the several sections of each coil are coupled in multiple arc. When the disk H is moved away from the disk G the plates $h' h^2$ engage the ends of the springs $g' g'$ and raise them out of contact with the plates $g^4$. In this position of the disks the sections of each coil will be coupled in groups of two and the groups in series. By moving the disk H still farther away from said disk G the several springs will rest separately on the individual plates $h h'$ and the sections of each coil will be connected in series.

Any suitable mechanism may be employed for moving the disk H into its several positions while the machine is in operation. I have shown for this purpose a cam H' connected by a system of levers $h^3$, $h^4$, $h^5$ with the hub of said disk H, as shown in Fig. 2.

For the purpose of variously connecting and grouping the armature coils $a' a'$, for producing currents of different degrees of quantity and intensity, various mechanical devices may be employed. In Figs. 2, 4 and 9 of the drawings is shown a convenient device for the purpose. It consists of a revoluble cylinder K provided on its periphery with insulated plates $k k$ which are arranged in corresponding groups parallel with the axis of the cylinder on opposite sides thereof, the plates of each group being severally connected with the corresponding plates of the opposite group by insulated rings $k^2$ within the cylinder to which rings the plates are attached by rods or suitable conductors $k^3 k^3$, as shown in Fig. 9. Upon opposite sides of the cylinder K are adjustably supported on shafts parallel with the axis of the cylinder insulated blocks L L' corresponding in number and arrangement with the brushes $b^2 b^3$ of commutator C' and connected therewith by suitable conductors, as shown in Fig. 2. The several blocks L L' are provided with adjustable contact plates or springs $l l'$ arranged to bear upon the plates $k k$. For the purpose of providing the terminal blocks L L' with greater bearing surfaces, I form them with extensions $l^2$ and the springs attached thereto with corresponding extensions $l^3$ as shown in Fig. 9. I prefer to mount the cam H' on the cylinder shaft, and provide the latter with a hand wheel $k^4$ or other suitable means of turning the cylinder. Or I may make the cylinder K stationary and move the blocks L L' about it; suitable means may be employed in connection with this device to indicate the various groupings or kinds of current or both, obtained.

For convenience in connecting the brushes $b^2$ $b^3$ of commutator C' with the several blocks L L' of the grouping device, I provide the brush supporting shafts $B^5$ with insulated plates $b^5$ set into longitudinal grooves therein and severally connected with the several brushes by pins or screws $b^4$ as seen in Fig. 8. By this construction the wires leading to the blocks L or L' of the grouping device may be bunched together and attached to the rods $b^5$ at the ends of the shafts $B^5$.

When the two sets of contact springs $l$ $l'$ occupy the positions indicated by dotted lines $l$ $l$, Fig. 4 with reference to the plates $k$ $k$ on cylinder K and the sections of the coils $a'$ $a'$ are connected in series, the sections and coils producing the working current will all be connected in series so as to produce a current of the highest intensity of which the machine is capable. In this particular case their being twelve coils or pairs of coils consisting of four sections each, forty-eight sections will be connected in series and the intensity of the current may be represented by the numeral 48, while the quantity may be represented by the numeral 1. When the contact springs $l$ $l'$ are moved into the positions indicated by dotted lines 2, 2, Fig. 4, two pairs will rest on double plates and the corresponding coils will be grouped for quantity, producing the effect of double elements if the analogy of a battery is employed; these groups will be joined in series with the remaining coils which are individually connected in series. The intensity of the resulting current may be numerically expressed by 44, and the quantity by $1\frac{1}{11}$. In each of the succeeding positions 3, 4, 5 and 6, an additional pair of coils is united for quantity, the several double groups in each instance being connected in series with the other groups and the individual coils which are not so grouped. From positions 7, 7 to 12, 12, inclusive, the sections of the coils are grouped in pairs and these groups are connected in series, more or less of said groups being doubled in the manner just described. Beginning with and following positions 13, 13, all the sections of each coil are joined for quantity, producing in effect elements of quadruple size, and these are connected in series of individual groups, or of one or more double groups with the remaining individual groups. Between these various groupings of the coils and their component sections, gradual change or variation of the current with respect to its intensity is effected by the movement of the brushes $b^2$ and $b^3$, as hereinbefore explained; but following positions 19, 19 on the coupling cylinder, I do not propose to change the quality of the current by the movement of the brushes. In positions 19, 19, all the coils are grouped in pairs, the several groups, six pairs in number being connected in series. In positions 21, 21, the coils are joined in groups of three, the several groups, four pairs in all, being connected in series, the intensity of the resulting current being numerically expressed by 4 and its quantity by 12. Finally in the last positions of the contact springs $l$ $l'$ indicated by dotted lines 24, 24, all the coils together with their component sections are connected in multiple arc and the intensity of the resulting current would be expressed numerically by 1, while its quantity would be designated in like manner by 48. Thus we see that in the machine taken to illustrate my invention, by the various couplings or groupings of the coils and their sections of which they are capable, currents of various qualities may be produced varying in intensity from 48 to 1, and in quantity from 1 to 48.

I claim—

1. In a dynamo electric machine, the combination with a revolving armature provided with a number of independent coils, of a commutator having a corresponding number of pairs of segmental plates with which the terminals of the corresponding coils are connected, the insulating spaces between the ends of said plates being arranged in lines oblique to the axis of rotation, and two sets of brushes arranged in pairs corresponding in number with said coils and the pairs of commutator plates with which they are arranged to make contact and connected with each other and with the exterior circuit in series, one set of brushes being movable circumferentially about the axis of the commutator toward and from the other, whereby said coils are included successively in the exterior circuit and generate an electric current for a greater or less portion of each revolution of the armature, and when not so included in the exterior circuit, are open and inoperative, substantially as and for the purposes set forth.

2. In a dynamo electric machine, the combination with a revolving armature having a number of independent coils, of a commutator having a like number of pairs of segmental plates with which the terminals of the corresponding coils are connected, the insulating spaces between the ends of said plates being arranged in lines oblique to the axis of rotation, two sets of brushes arranged to engage in pairs with the corresponding pairs of commutator plates and connected with each other and with the exciting circuit in series, one set being movable circumferentially about the axis of the commutator toward and from the other, whereby said coils are included successively in the exciting circuit and generate current for a greater or less portion of each revolution of the armature, and when not so included, are open and inactive, a field magnet, the windings of which are connected with the terminal brushes, and electro magnetic mechanism connected with the working circuit and with one set of brushes and arranged to automatically shift said brushes toward and from the other set, according to variations in the strength of the working current, substantially as and for the purposes set forth.

3. In a dynamo-electric machine, the combination with a revolving armature provided with a number of independent coils, of a commutator having a corresponding number of pairs of segmental plates with which the terminals of the coils are connected, and continuous rings interposed between the several pairs of segmental plates and two sets of brushes through which and said rings the coils are connected in series, one set of brushes being movable circumferentially about the commutator toward and from the other, whereby the coils are included for a greater or less portion of each revolution of the armature in circuit and when not so included are open, substantially as and for the purposes set forth.

4. In a dynamo-electric machine, the combination with a revolving armature provided with a number of independent coils each composed of sections, a coupling device arranged to connect the sections of each coil in series or multiple arc, a commutator having a corresponding number of segmental plates with which the terminals of the coils are connected, and two sets of brushes one set being movable toward and from the other, whereby said coils are included in circuit for a greater or less portion of each revolution of the armature, substantially as and for the purposes set forth.

5. In a dynamo-electric machine, the combination with a revolving armature provided with a number of independent coils, a commutator having a corresponding number of pairs of segmental plates with which the terminals of the coils are connected, the insulating spaces between the ends of said plates being in lines oblique to the axis of rotation, two sets of brushes, one set being movable circumferentially around the commutator toward and from the other, whereby said coils are included in circuit for a greater or less portion of each revolution of the armature, and when not so included are open, and a coupling device by which the coils are severally or in groups connected with each other and the exterior circuit in series and by which they are variously grouped for greater or less quantity, substantially as and for the purposes set forth.

6. In a dynamo-electric machine, the combination with a revolving armature provided with a number of independent coils, and a coupling device consisting of two disks revolving concentrically with the armature, one disk being movable laterally toward and from the other, and provided with insulated contact pieces variously grouped and connected according to the coupling to be effected of the sections of the coils and the other disk being provided with insulated blocks with which the terminals of the coils are connected and insulated springs with which the terminals of the sections are connected, arranged to bear against the various contact pieces of the other disk in the different positions of the latter, substantially as and for the purposes set forth.

7. In a dynamo-electric machine, the combination with a revolving armature provided with a number of independent coils, a commutator having a number of pairs segmental plates, with which the terminals of the coils are connected, the insulating spaces between the ends of said plates being in lines oblique to the axis of rotation, a like number of pairs of brushes, one brush of each pair being movable circumferentially around the commutator toward and from the other whereby said coils are included in circuit for a greater or less portion of each revolution of the armature and when not included are open, a coupling device whereby two or more of said coils are grouped for quantity and a regulator whereby the strength of the circuit is maintained constant when changes are made for both quantity and intensity, substantially as and for the purposes set forth.

8. In a dynamo-electric machine, the combination with the field magnet, of a revolving armature provided with a number of independent coils, a commutator provided with a like number of pairs of segmental plates with which the terminals of the coils are connected, the insulating spaces between the ends of said plates being in lines oblique to the axis of rotation, two sets of brushes working in pairs with the corresponding pairs of segmental plates, one set being movable toward and from the other, continuous rings interposed between the several pairs of segmental commutator plates and serving to connect the coils through the brushes in series, and mechanism connected with the main circuit and arranged to automatically change the distance between the two sets of brushes according to variations in the strength of said main circuit, substantially as and for the purposes set forth.

9. In a dynamo-electric machine, the combination with the field magnet and armature supplying the working circuit, of a revolving armature provided with a number of independent coils, means for connecting said coils with each other a commutator having a like number of pairs of segmental plates with which the terminals of said coils are connected, the insulating spaces between the ends of said segmental plates being in lines oblique to the axis of rotation, two sets of brushes working in pairs with the corresponding pairs of segmental plates, one set being movable toward and from the other, the said several coils being connected through said brushes in series, and the terminals connected with the windings of the field magnet, automatic regulating mechanism connected with the movable brush holder, two electro magnets and their armature connected with said mechanism, a switch arranged to divert a portion of the current through either one of said magnets, and an electro magnet connected with the working circuit so as to operate said switch when the working current exceeds a certain strength, substantially as and for the purposes set forth.

10. In a dynamo-electric machine, the combination with a revolving armature provided with independent coils which are connected in series with the windings of the field magnet through two sets of brushes, one set being movable toward and from the other, and means for connecting said coils with each other of automatic brush adjusting mechanism, consisting of two friction wheels each geared through suitable mechanism with the movable brush holder, a constantly rotated friction driver with which said friction wheels are arranged to engage one at a time, a pivoted armature arranged when moved in one direction to bring one of said friction wheels into engagement with said friction driver and when moved in the other direction to bring the other friction wheel into engagement with said driver, two electro magnets arranged to move said armature in opposite directions, and an automatic switch consisting of two contact points connected one with the windings of one of said magnets, the other with the windings of the other magnet, of an electro-magnet the windings of which are connected with the working circuit and its armature movable between said contact points, substantially as and for the purposes set forth.

11. In a dynamo-electric machine, the combination with a revolving armature provided with a number of independent coils, a commutator having a like number of pairs of segmental plates with which the terminals of the corresponding coils are connected and a like number of pairs of brushes working with the said segmental commutator plates, of a coupling device, consisting of two sets of contact springs, individually connected with said brushes, and a cylinder provided with contact plates arranged in corresponding and connected groups on opposite sides thereof, said plates varying in width in different groups so as to couple together two or more pairs of coils, substantially as and for the purposes set forth.

12. In a dynamo-electric machine, the combination with a revolving armature provided with a number of independent coils, a commutator having a like number of pairs of segmental plates with which the terminals of the corresponding coils are connected, and two sets of brushes working in pairs with the corresponding pairs of segmental commutator plates, of a coupling device consisting of two sets of contact springs severally connected with said brushes and of a revoluble cylinder provided on opposite sides with corresponding groups of insulated contact plates, and insulated rings connecting the plates on one side of the cylinder with the plates of the corresponding groups on the opposite side of the cylinder, substantially as and for the purposes set forth.

13. In a dynamo-electric machine, the combination with a revoluble armature provided with a number of independent coils, a commutator having a like number of pairs of segmental plates with which the terminals of the corresponding coils are connected, the insulating spaces between the ends of said plates being in lines oblique to the axis of the commutator, and two sets of brushes working in pairs with the corresponding pairs of commutator plates, one set of brushes being movable toward and from the other, of a coupling device consisting of a revoluble cylinder having two sets of contact plates arranged in corresponding groups on opposite sides of said cylinder, the plates of the corresponding opposite groups being electrically connected, and two sets of contact springs on opposite sides of said cylinder, severally connected with said brushes, substantially as and for the purposes set forth.

14. In a dynamo-electric machine, the combination with a revolving armature having a number of independent coils, of a commutator having a like number of pairs of segmental plates with which the terminals of the corresponding coils are connected, two sets of brushes arranged to work in pairs with the corresponding pairs of commutator plates, brush supporting rods or bars parallel with the axis of the commutator, provided with insulated conductors which are inserted in longitudinal grooves in said rods or bars and are severally connected with said brushes, and a coupling device consisting of two sets of contacts severally connected with said insulated conductors at the ends of the rods or bars in which they are inserted, and a revoluble cylinder provided with insulated plates correspondingly grouped on opposite sides thereof, substantially as and for the purposes set forth.

15. In a dynamo-electric machine, the combination with a commutator, divided transversely to its axis into a number of sections, two sets of brushes working in pairs with corresponding sections of the commutator, brush supporting rods or bars arranged parallel with the periphery of the commutator and formed with longitudinal grooves, and insulated conductors inserted in said grooves and each connected with a brush, substantially as and for the purposes set forth.

In testimony that I claim the foregoing as my own I affix my signature in presence of two witnesses.

CHARLES L. F. MÜLLER.

Witnesses:
CHAS. L. GOSS,
E. H. BOTTUM.